W. T. WILSON.
MEANS FOR HOLDING A PLURALITY OF GAS MANTLES.
APPLICATION FILED NOV. 6, 1913.
1,138,435.
Patented May 4, 1915.
2 SHEETS—SHEET 2.
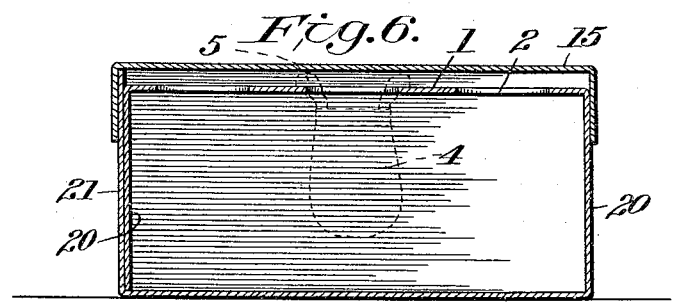
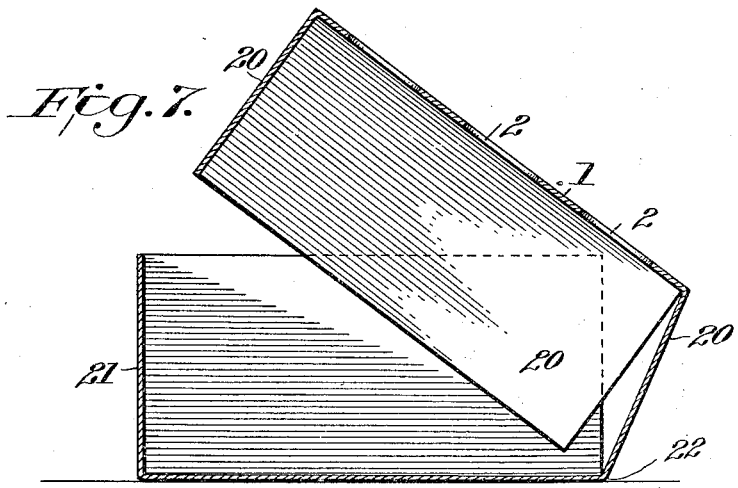
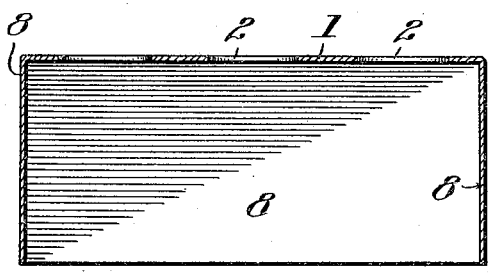
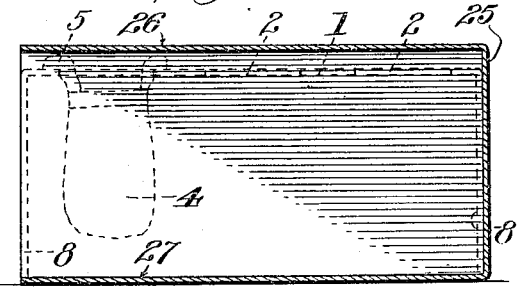

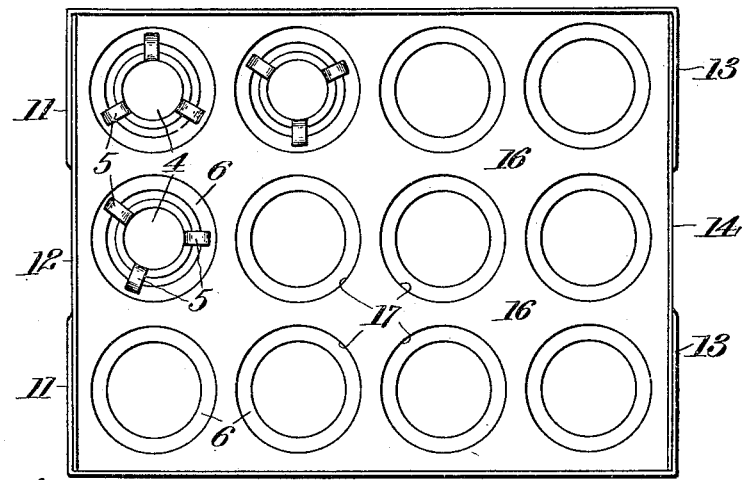
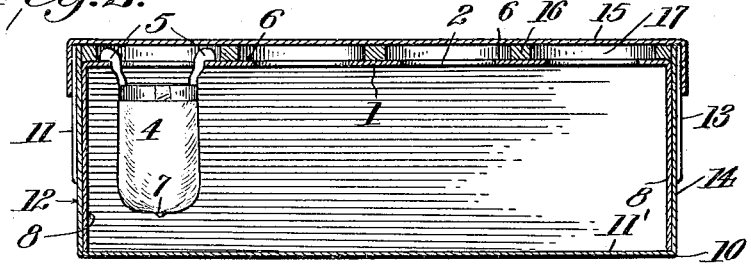
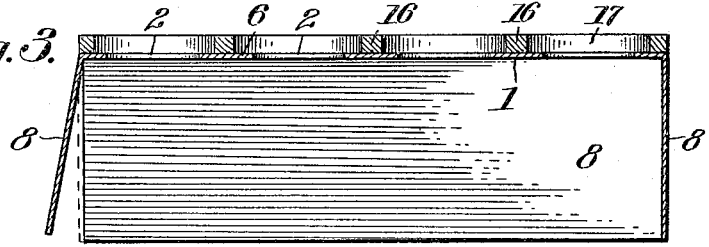
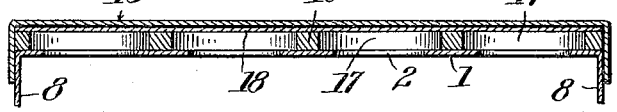
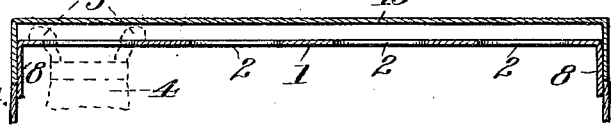

UNITED STATES PATENT OFFICE.

WYLE T. WILSON, OF PHILADELPHIA, PENNSYLVANIA.

MEANS FOR HOLDING A PLURALITY OF GAS-MANTLES.

1,138,435. Specification of Letters Patent. Patented May 4, 1915.

Application filed November 6, 1913. Serial No. 799,540.

*To all whom it may concern:*

Be it known that I, WYLE T. WILSON, a citizen of the United States, residing at Philadelphia, in the county of Philadelphia and State of Pennsylvania, have invented certain new and useful Improvements in Means for Holding a Plurality of Gas-Mantles; and I do hereby declare the following to be a full, clear, and exact description of the invention, such as will enable others skilled in the art to which it appertains to make and use the same.

This invention relates to boxes for holding and shipping a plurality of gas mantles, and has for its object to provide an efficient and inexpensive container, and one which will also enable the mantle to be more conveniently removed than has been the case heretofore.

With these and other objects in view, the invention consists in the novel details of construction and combination of parts more fully hereinafter disclosed and particularly pointed out in the claims.

Referring to the accompanying drawings, forming a part of this specification, in which like numerals designate like parts in all the views, Figure 1 is a diagrammatic plan view of one form of my invention; Fig. 2 is a cross sectional view of the parts shown in Fig. 1, with a cover applied to the package; Fig. 3 is a sectional view of the inner mantle holding parts of Fig. 2 removed from the outer casing; Fig. 4 is a fragmentary sectional view of a modified form of the parts shown in Fig. 3; Fig. 5 is a further modified form of the parts shown in Fig. 4; Fig. 6 is a sectional view of a still further modified form of package; Fig. 7 is a sectional view of another modified form of package, with its cover removed; Fig. 8 is a sectional view of a further modified form of mantle holder; and Fig. 9 is a sectional view of the mantle holder shown in Fig. 8, when inserted in a casing.

Referring more particularly to Figs. 1 to 5, 1 represents a member of sheet material, preferably paper, provided with holes 2 sufficiently large to permit the body 4 of the mantles to pass, but too small to pass the feet 5 of said mantles, which accordingly rest upon the surface 6 surrounding said holes. The sheet like member 1, is provided with supports sufficiently high to suspend the bottoms 7 of the mantles free of all obstructions, and in the examples shown in said Figs. 1 to 5, these supports are conveniently formed of bent over members or flaps 8, which are longer than said mantles, and are integrally or otherwise attached to the supporting sheet 1.

It will now be clear that since the mantles are provided with three feet 120° apart, they will firmly rest in the holes 2 which said feet fit, be supported clear of all obstructions and no amount of shaking will loosen them. In order to complete the shipping package, the said supporting sheet 1, and supports 8 are, in the examples shown in said Figs. 1 to 5, inclosed in an outer casing 10, which may be of any desired construction, but I prefer a knock down form having the flaps 11, 12, 13, and 14 as shown, and this outer casing is made of such dimensions that while the supports 8 rest upon the bottom 11' of said casing, the supporting perforated sheet 1 will occupy a position at or near the top of said outer casing, so that a cover 15 may not only fit over said sheet 1 but may also serve to hold down in place the feet 5 of said mantles all as will be clear from Fig. 5.

In the form shown in Figs. 1, 2 and 3, I rest upon the perforated supporting sheet 1, a perforated cushioning sheet 16 having perforations 17 larger than the perforations 2, and of a size to fit, or slightly larger than the outer edges of the feet 5. These perforations 17 are thus sure to protect the fragile legs 5, of the mantle, and if the cushioning sheet 16 is glued or otherwise secured to the sheet 1, (which it may or may not be, according to the wishes of the shipper), the said sheet 16 will greatly strengthen the sheet 1.

In the form shown in Fig. 4, an additional flat sheet 18 is placed over the cushioning sheet 16, and a cover 15 placed over the whole, in order to form a very solid and secure package.

In the form shown in Figs. 6 and 7, the sheet 1, supports 20, and outer container 21 are all formed from a single blank as will be clear from the drawings. That is to say the supports 20 are hingedly attached to the outer container 21 as at 22, and the said support and perforated sheet 1 are readily movable in and out of the container 21 as will be clear from Fig. 7. The cover 15 fits down around the walls of the container 21, one of the supports 20, and on top of the feet 5 of the mantle 4 as indicated, thus holding all the parts securely in place.

In the form shown in Figs. 8 and 9 the perforated supporting plate 1 and supports 8 slide in and out of the open ended container 25, which is of such dimensions as to cause the feet 5 of the mantles to rest snugly under the wall 26 when the said supports 8 rest on the wall 27 as indicated in dotted lines in Fig. 9.

It will thus be seen that in all of the forms, when the cover or other holding member is removed from the feet of the mantle, a plurality of mantles is exposed, and the user can readily grasp the said mantle feet by one hand and remove the same for use. The advantage of this procedure will be appreciated when it is said that a very much larger number of mantles are used in municipal lighting for street lamps, public buildings, etc., than are used in private homes; so that the attendant who goes around to resupply broken mantles can carry one of my packages in one hand, and readily withdraw the mantle with the other hand, thereby saving a great deal of time and also saving a very considerable breakage which is now experienced in connection with the present package, containing a single mantle. In fact, where the attendant has to climb up to a mantle located on a street lamp or other inaccessible position, he can hold the package with one hand while steadying himself, and readily withdraw the mantle with the other hand, and rest them on the lamp without incurring the present danger of breakage which is experienced with the present package.

It is obvious that those skilled in the art, may vary the arrangement of parts as well as the details of construction without departing from the spirit of my invention, and therefore I do not wish to be limited to the above disclosure, except as may be required by the claims.

What I claim is:—

1. In a container for gas mantles, the combination of an integral member provided with a plurality of holes each of a size greater than the outer circumference of the bodies of the mantles to be stored, but less than the outer circumference of the feet of said mantles; a support for said member adapted to prevent the bodies of said mantles contacting with the walls of said container; and means associated with said container for holding said feet against the surface of said member, substantially as described.

2. In a container for a plurality of gas mantles, the combination of a member of integral sheet material having a plurality of perforations the circumference of each of which is larger than the bodies of the said mantles but smaller than the circle occupied by the feet of said mantles; integral supports for said member adapted to prevent the bodies of said mantles from contacting with the walls of said container; a second sheet like member adapted to overlie said first named perforated member; and means for holding said second sheet like member and mantle feet in their positions when resting on the surface of said first sheet like member, substantially as described.

3. In a container for a plurality of gas mantles, the combination of a member of sheet material having a plurality of perforations the circumferences of each of which are larger than the bodies of the said mantles but smaller than the circle occupied by the feet of said mantles; integral supports for said member adapted to prevent the bodies of said mantles from contacting with the walls of said container; a second sheet like member provided with perforations larger than the circle on which said feet rest, adapted to overlie said first named perforated member; and means for holding said second sheet like member and mantle feet in their positions when resting on the surface of said first sheet like member, substantially as described.

4. A container for a plurality of mantles comprising an integral perforated sheet having supports longer than the bodies of said mantles, combined with means for detachably holding the feet of said mantles against said perforated sheet, substantially as described.

In testimony whereof I affix my signature, in presence of two witnesses.

WYLE T. WILSON.

Witnesses:
 BLANCHE K. BRYAN,
 MARY F. McINTYRE.

Copies of this patent may be obtained for five cents each, by addressing the "Commissioner of Patents. Washington, D. C."